United States Patent
Huang et al.

(10) Patent No.: US 8,035,999 B2
(45) Date of Patent: Oct. 11, 2011

(54) ISOLATING SELF-OSCILLATION FLYBACK CONVERTER

(75) Inventors: Jiangjian Huang, Guangdong (CN); Jianfeng Song, Guangdong (CN)

(73) Assignee: Mornsun Guangzhou Science & Technology Limited, Guangdong (CN)

( * ) Notice: Subject to any disclaimer, the term of this patent is extended or adjusted under 35 U.S.C. 154(b) by 0 days.

(21) Appl. No.: 12/377,123

(22) PCT Filed: Aug. 27, 2007

(86) PCT No.: PCT/CN2007/002572
§ 371 (c)(1),
(2), (4) Date: May 6, 2010

(87) PCT Pub. No.: WO2008/028407
PCT Pub. Date: Mar. 13, 2008

(65) Prior Publication Data
US 2010/0220502 A1    Sep. 2, 2010

(30) Foreign Application Priority Data

Sep. 5, 2006 (CN) .......................... 2006 1 0037489

(51) Int. Cl.
*H02M 3/335* (2006.01)
(52) U.S. Cl. ...................... 363/19; 363/21.15
(58) Field of Classification Search .............. 363/21.15, 363/19, 18
See application file for complete search history.

(56) References Cited

U.S. PATENT DOCUMENTS

| | | | |
|---|---|---|---|
| 4,573,112 A * | 2/1986 | Numata et al. | 363/19 |
| 6,525,948 B2 * | 2/2003 | Hsu | 363/56.11 |
| 7,881,077 B2 * | 2/2011 | Hsu | 363/21.12 |

* cited by examiner

*Primary Examiner* — Shawn Riley
(74) *Attorney, Agent, or Firm* — George G. Wang; Wilkinson & Grist

(57) ABSTRACT

An isolating self-oscillation flyback converter includes a coupling transformer T1, a FET TR1, a transistor TR2, a photoelectric coupling isolator OC1 and a load feedback circuit Adj. The common polarity terminal of a feedback winding Nfb of the coupling transformer T1 is connected to the gate of the FET TR1 via a capacitance C1 and a resistance R2, and connected to the base of the transistor TR2 via a capacitance C2. The base of the transistor TR2 is also connected to the emitter of the photoelectric coupling isolator OC1. The photoelectric coupling isolator OC1 is connected to the positive terminal of the output voltage. The opposite polarity terminal of the feedback winding Nfb is connected to the collector of the photoelectric coupling isolator OC1 via a resistance R5, and connected to ground via a capacitance C5. The common polarity terminal of the feedback winding Nfb is also connected to the cathode of a diode D, and the anode of the diode D is connected to ground. A set of windings are removed by forming a loop circuit directly between the feedback winding Nfb and the photoelectric coupling isolator OC1.

3 Claims, 5 Drawing Sheets

ISOLATING SELF-OSCILLATION FLYBACK CONVERTER

1. FIELD OF THE INVENTION

The invention relates to an isolating self-oscillation flyback converter for simplifying the winding structure of a transformer used in the self-oscillation flyback power supply module.

2. DESCRIPTION OF THE RELATED ART

Traditional isolating self-oscillation flyback converter includes a transformer, a FET, a transistor, a photoelectric coupling isolator and a circuit Adj, as indicated in FIG. 1, wherein, the input is connected to the source of the FET TR1 via the primary winding P1 of a transformer T and to the collector of a transistor TR2 via resistances R1 and R2, the gate of a FET TR1 is connected to the collector of the transistor TR2, the common polarity terminal of the secondary winding P2 of the transformer T is connected to the collector of the transistor TR2 and the gate of the FET TR1 via a resistance R2 and a capacitance C1 and to the base of the transistor TR2 via a capacitance C2, and the other end of the secondary winding P2 is connected to ground. The source of the transistor TR1 is connected to ground via a resistance R4 and to the base of the transistor TR2 via parallel connection of a resistance R3 and a capacitance C3, the base of the transistor TR2 is also connected to the emitter of the photoelectric coupling isolator OC1, and the photoelectric coupling isolator OC1 is connected to the load via the circuit Adj. Following a voltage is applied on the input, current flows directly through the resistances R1 and R2 to conduct the transistor TR1, and the current flows through the primary winding P1, with the coupling effect causing the upper end of the winding to be negative and the lower end be positive so as to form a forward feedback via the capacitance C1 and the resistance R2, thereby rapidly conducting the transistor TR1. After TR1 is conducted, current flowing through the primary winding P1 and the transistor TR1 produces a voltage drop over the resistance R4, with the upper end thereof being positive and the bottom end being negative thereby conducting the transistor TR2 via the resistance R3 and the capacitance C3. The conduction of the transistor TR2 bypasses the gate of the transistor TR1, so the transistor TR1 is cut off. After that, the polarity of the winding P1 starts to be converted, and due to the coupling effect, the polarity of all other windings starts to be converted, and the power reserved in the transformer is forwarded to the output via the winding P3. After the reserved power in the transformer is released completely, voltages on all the windings will be zero, which means the voltage of the winding P2 will be zero. The transistor TR1 tends to be conducted via the capacitance C1, and current flows through the primary winding P1 again, with the coupling effect causing the upper end of the secondary winding P2 to be negative and the bottom end be positive so as to form forward feedback via the capacitance C1 and the resistance R2, so that the transistor TR1 is conducted again rapidly. The above steps are repeated to form a self-excited oscillation. In such a circuit, the photo coupler is powered by a separate winding P4, and when the transistor TR1 is in its on-state, the power reserved in the capacitance C5 provides the photo coupler with bias current.

As the coupling transformer in the above mentioned circuit requires four windings, which brings complexity of the production process and is difficult for manufacture, there could be many problems and difficulties in practice.

3. SUMMARY OF THE INVENTION

The invention aims to provide a simplified winding structure for a transformer, and an isolating self-oscillation flyback converter that improves the production complexity of the transformer.

To this end, the invention provide an isolating self-oscillation flyback converter, wherein a loop circuit is directly arranged between a feedback winding Nfb and a photoelectric coupling isolator OC1, providing required power to the photo coupler.

In particular, the invention provides an isolating self-oscillation flyback converter, including a coupling transformer T1, a FET TR1, a transistor TR2, a photoelectric coupling isolator OC1 and a load feedback circuit Adj, wherein, the common polarity terminal of a feedback winding Nfb of the coupling transformer is connected to the gate of the FET TR1 via a capacitance C1 and a resistance R2, and connected to the base of the transistor TR2 via a capacitance C2, the base of the transistor TR2 is also connected to the emitter of the photoelectric coupling isolator OC1, and, the photoelectric coupling isolator OC1 is connected to the load via the feedback circuit, the opposite polarity terminal of the feedback winding Nfb is connected to the collector of the photoelectric coupling isolator OC1 via a resistance R51, and connected to ground via a capacitance C51; the common polarity terminal of the feedback winding (Nfb) is also connected to the cathode of a diode D2, and the anode of the diode D is connected to ground; and the feedback winding Nfb provides a voltage for driving the gate of the FET TR1 during the transformer stores power, and charges the capacitance C51 during the transformer releases power, for supplying required power for the photo coupler. Thus, a set of windings are removed by forming a loop circuit directly between the feedback winding Nfb and the photoelectric coupling isolator OC1.

The invention also provides the following embodiment: an isolating self-oscillation flyback converter, including a coupling transformer T1, a FET TR1, a transistor TR2, a photoelectric coupling isolator OC1 and a load feedback circuit Adj, wherein, the common polarity terminal of a feedback winding Nfb of the coupling transformer is connected to the gate of the FET TR1 via a capacitance C1 and a resistance R2, and connected to the base of the transistor TR2 via a capacitance C2, the base of the transistor TR2 is also connected to the emitter of the photoelectric coupling isolator OC1, and, the photoelectric coupling isolator OC1 is connected to the load via the feedback circuit, the opposite polarity terminal of the feedback winding Nfb is connected to ground, the common polarity terminal of the feedback winding Nfb is also connected to the anode of a diode D3, the cathode of the diode D3 is connected to the collector of the photoelectric coupling isolator OC1 via a resistance R51, and the cathode of the diode D3 is connected to ground via the electrolytic capacitance C51.

The invention possesses the following advantages over the prior art:

(1) a set of winding is removed, layout structure is simplified, and production process for transformers is reduced and improved;

(2) voltage of the winding set Nfb during forward feedback is the sum of voltage of the capacitance C51 and that of the transformer winding Vnfb, thereby reducing the coil number of the winding Nfb; and (3) changes in the voltage for driving a MOS resulted from changes of input voltage are reduced.

4. BRIEF DESCRIPTION OF THE DRAWINGS

5. DETAILED DESCRIPTION OF PREFERRED EMBODIMENTS

Figure 1:
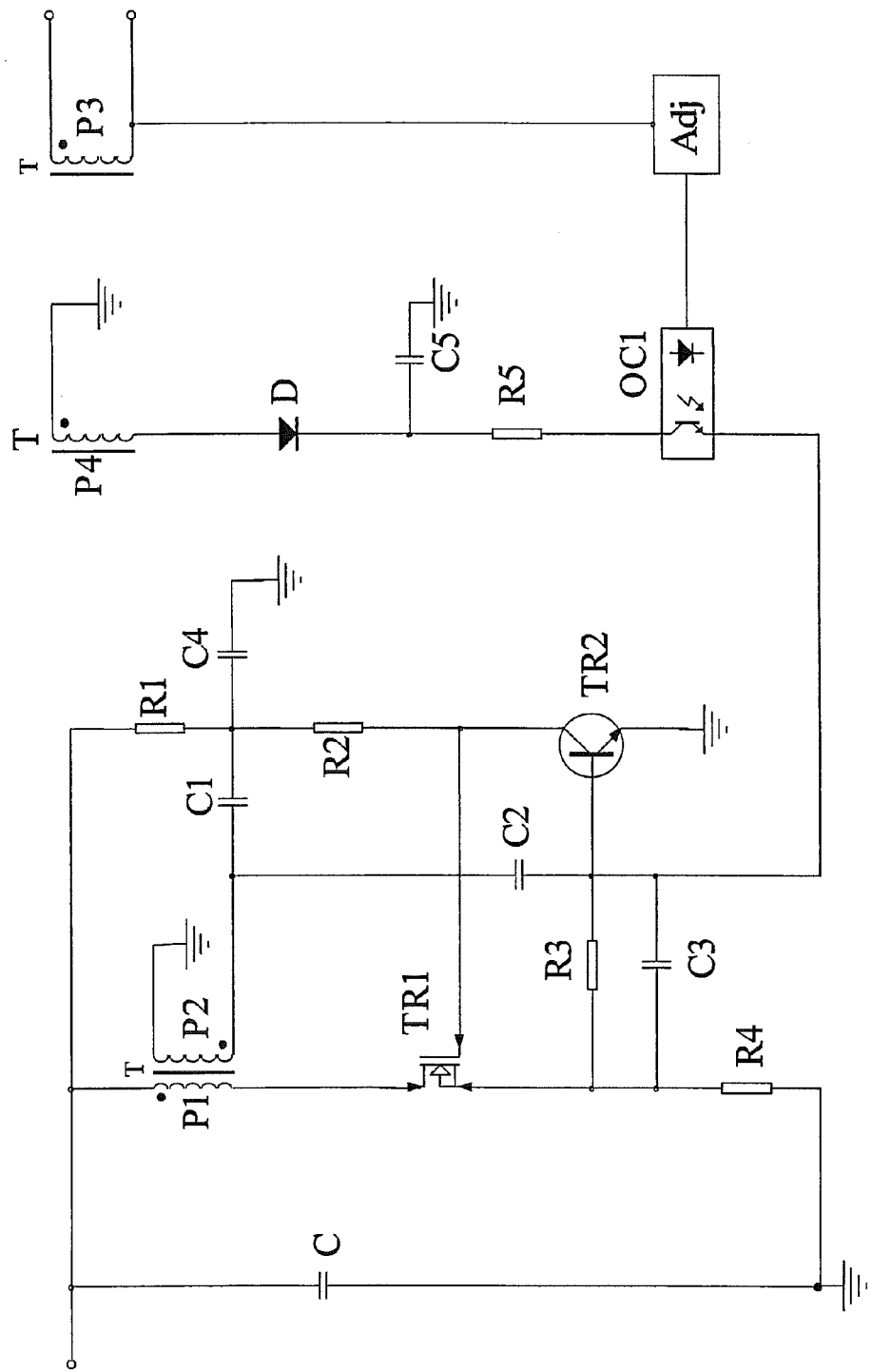
FIG. 1 is a circuit diagram of current isolating self-oscillation flyback converter.
Figure 2:
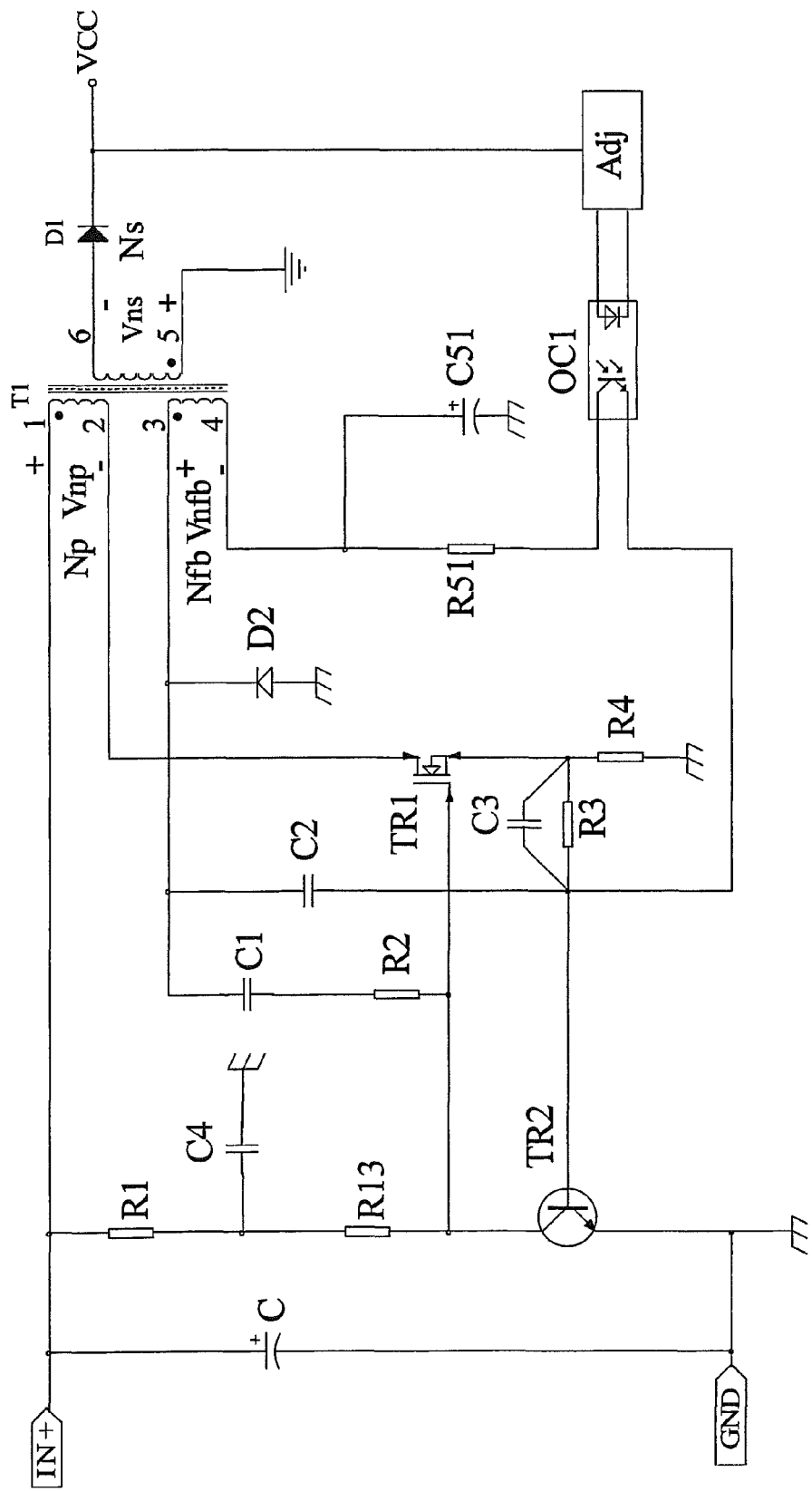
FIG. 2 is a circuit diagram according to the first embodiment of the invention.

As shown in FIG. 2, the converter according to the first embodiment of the invention includes a transformer T1, a FET TR1, a photoelectric coupling isolator OC1 and a circuit Adj, the input is connect to the source of the FET TR1 via the primary winding Np of the transformer T1 and to the collector of the transistor TR2 via resistances R1 and R13, the gate of the FET TR1 is connected to the collector of the transistor TR2, and the collector of the transistor TR2 is also connected to the secondary winding Nfb via a resistance R2 and a capacitance C1. The source of the transistor TR1 is connected to ground via a resistance R4 and to the base of the transistor TR2 via parallel connection of a resistance R3 and a capacitance C3. The base of the transistor TR2 is connected to the emitter of the photoelectric coupling isolator OC1, and to the common polarity terminal of the feedback winding Nfb via a capacitance C2. The photoelectric isolator OC1 is connected to the load through the feedback circuit Adj, and the load is connected to the output winding Ns via a diode D1. The opposite polarity terminal of the feedback winding Nfb is connected to the collector of the photoelectric isolator OC1 via a resistance R51, and to ground via an electrolytic capacitance C51. The common polarity terminal of the feedback winding Nfb is also connected to the cathode of the diode D2, and the anode of the diode D2 is connected to ground. Thus, by directly forming a loop circuit between the feedback winding Nfb and the photoelectric coupling isolator OC1, a set of winding is not needed.

After applying a voltage Vin on the input, the grid capacitance (i.e., Cgs) of the MOS TR1 is charged by a soft start circuit formed by the resistances R1 and R13 and a capacitance C4. When the voltage of the grid capacitance Vgs reaches the actuation voltage Uth of the MOS TR1, the MOS TR1 is actuated, input current ip starts to flow through the primary winding Np of the transformer and produces a voltage over the winding, as shown in FIG. 2, wherein, the terminal marked with a black point on the transformer winding is the common polarity terminal, and at this time, for the voltage Vnp on the primary winding, the upper end is positive and the bottom is negative, namely the common polarity terminal has a positive voltage. At this time, the feedback winding Nfb induces a feedback voltage Vnfb, whose polarity is shown in the figure, and the value of Vnfb is positive too. Vnfb further charges the grid capacitance Cgs of the MOS TR1 via a branch of C1 and R2, that is to say, Nfb forms a forward feedback path to rapidly conduct the MOS TR1. When the value of Vnp is positive, the induction voltage Vns of the output winding Ns is also positive (its polarity is shown in the figure), and due to the reverse blocking effect of the diode D1, Vns is unable to form a loop circuit with the output circuit, and the load is powered by the output capacitance. After the MOS TR1 is conducted fully, the input circuit ip≈ΔtVnp/Lnp, i.e., the value of ip increases linearly. When voltage over the current limiting resistance R4 increases to reach the actuation voltage Ube of the triode TR2, TR2 is conducted and the grid capacitance of the MOS TR1 starts to discharge over the triode, and the MOS TR1 starts to enter into the constant resistance region from the constant current region. When the grid capacitance Cgs discharges until Vgs<Uth, MOS TR1 is cut off. In accordance with the Lentz's Rule, transformer winding voltages Vnp, Vns and Vnfb start to reverse. At this time, the diode D2 starts to be conducted, and Vnfb starts to charge the capacitance C51 and supply power to the triode in the photo coupler (when the Vnfb is positive, the triode in the photo coupler is powered by the capacitance C51). An output rectifier diode D1 starts to be conducted and Vns supply power to the load and at the same time charge the output capacitance. Input voltages Vin and Vnp are applied on the drain of the MOS TR1 together. The photo coupler OC1 serves the function of isolating the feedback output from the input circuit. The resistance R51 limits the transport current ie of the photo coupler (also referred as the error current), with the transport current ie producing an error voltage Ve via the resistances R3 and R4. The output voltage controls the error voltage by adjusting the circuit Adj, and the resistance R3 and the capacitance C3 further form an acceleration circuit to accelerate the actuation and cutoff of the triode TR2. When the reserved power in the transformer is released completely, the voltages Vnp, Vns and Vnfb over the transformer winding changes to be zero, the grid capacitance Cgs of the MOS TR1 is charged by the capacitance C51 via the feedback winding Nfb, the capacitance C1 and the resistance R2, and once the voltage Vgs reaches Uth, the MOS TR1 starts to be conducted, a voltage is produced over the input winding Np, and at the same time, the feedback winding Nfb induces the voltage Vnfb and causes forward feedback via the capacitance C1 and the resistance R2, thereby the MOS TR1 is rapidly conducted. A new circulation proceeds to start again.

Figure 3:
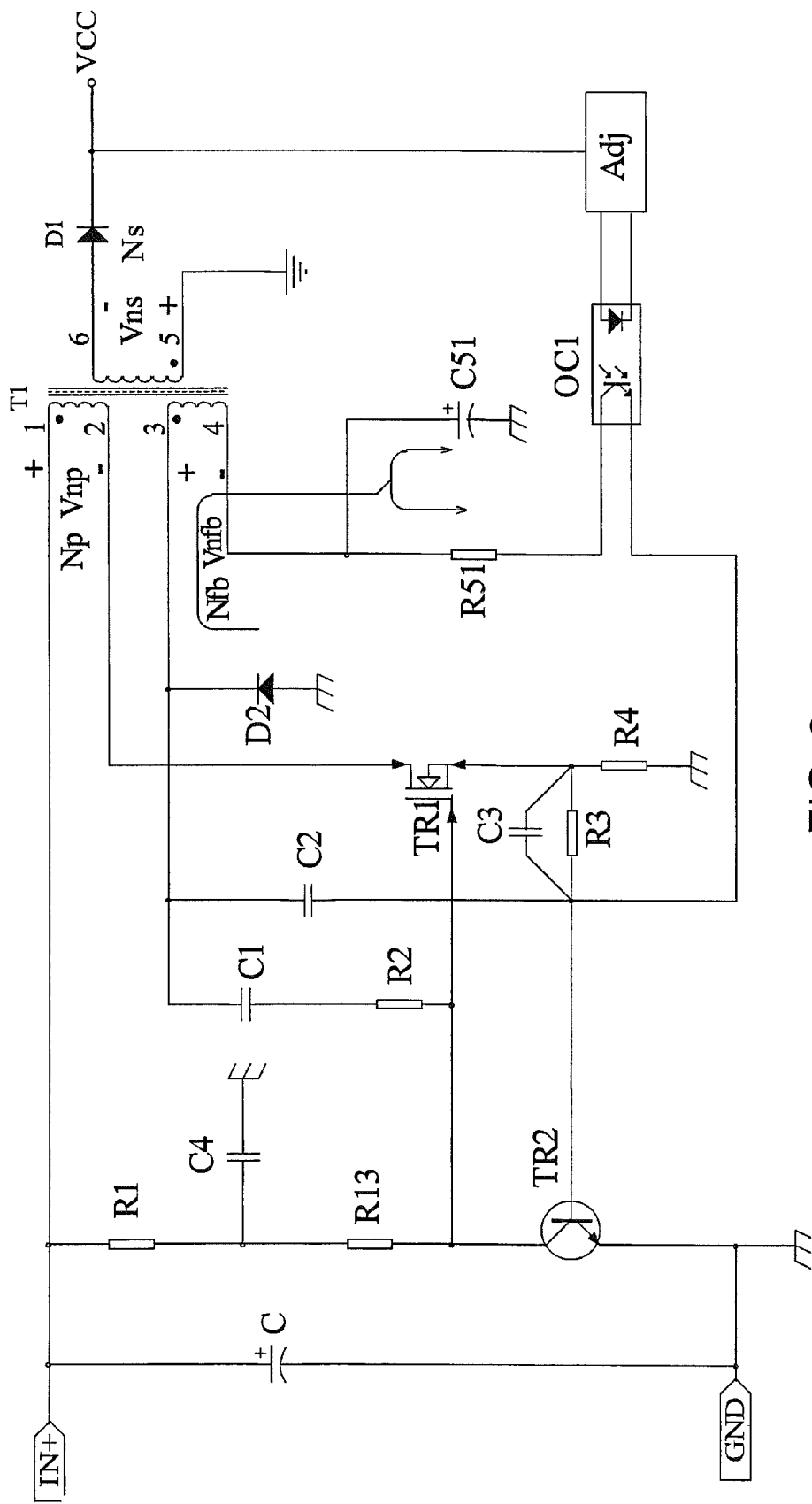
FIG. 3 is a current flow diagram during positive driven period according to the embodiment of FIG. 2.
Figure 4:
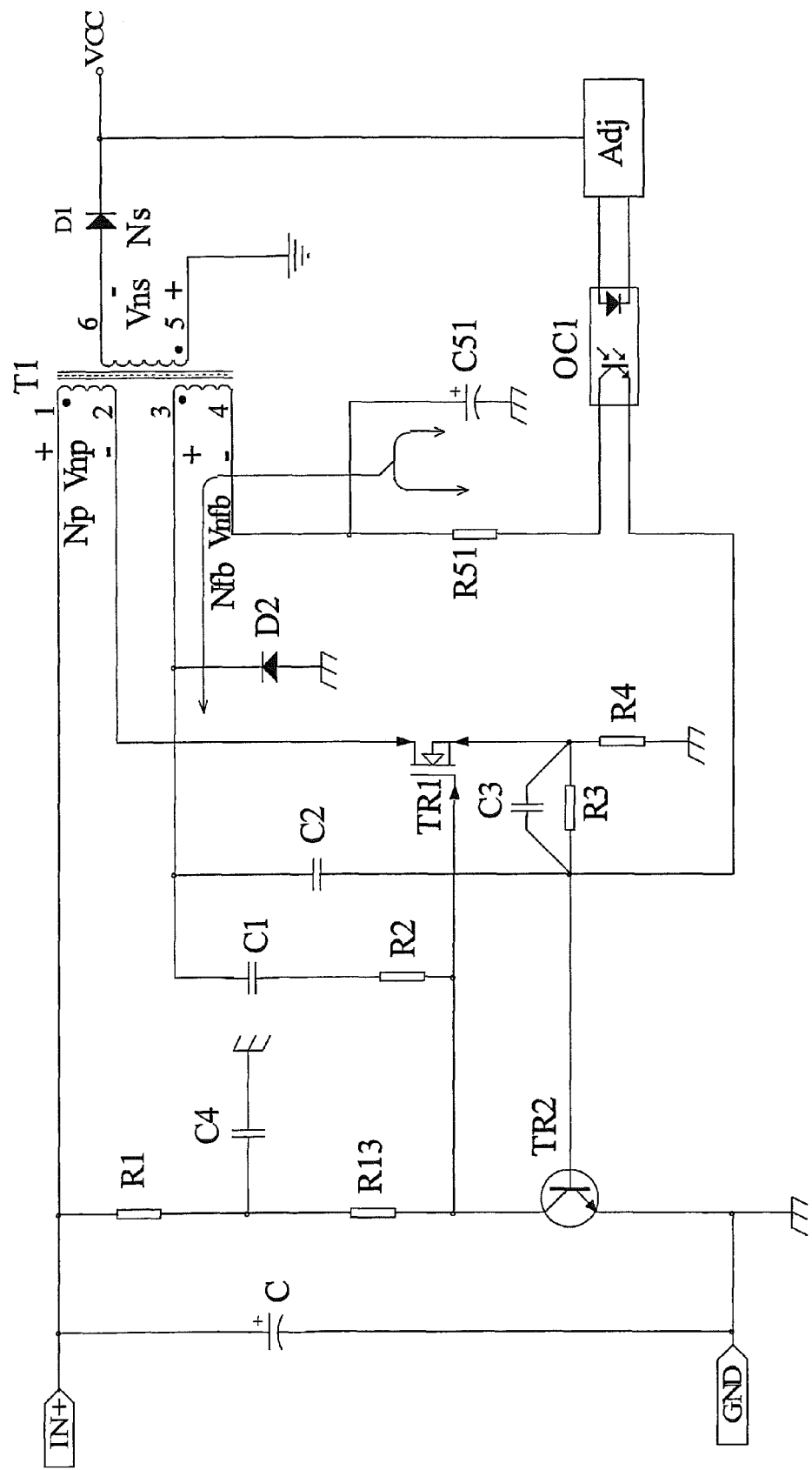
FIG. 4 is a current flow diagram during negative driven period according to the embodiment of FIG. 2.

It could be seen from the above process that, the feedback winding Nfb serves not only the function of forming a forward feedback but also that of supply a bias current (namely power supply) to the triode in the photo coupler, while the prior design needs to add another winding to power the photo coupler. When the feedback winding Nfb performs forward feedback, the current flow is as shown in FIG. 3, and when the feedback winding Nfb performs flyback feedback, the current flow is shown in FIG. 4.

Therefore, the invention could remove a set of winding, thereby simplifying the layout structure, reducing production process for a transformer, and improve the production process for a transformer. In addition, the voltage on the winding Nfb during forward feedback is the sum of the voltage on the capacitance C51 and the voltage on the transformer winding Vnfb, thus reducing the coil number of the winding Nfb, and after the reduction, changes in the driving voltage of the MOS resulted from changes of the input voltage is smaller, compared to the prior design.

Figure 5:
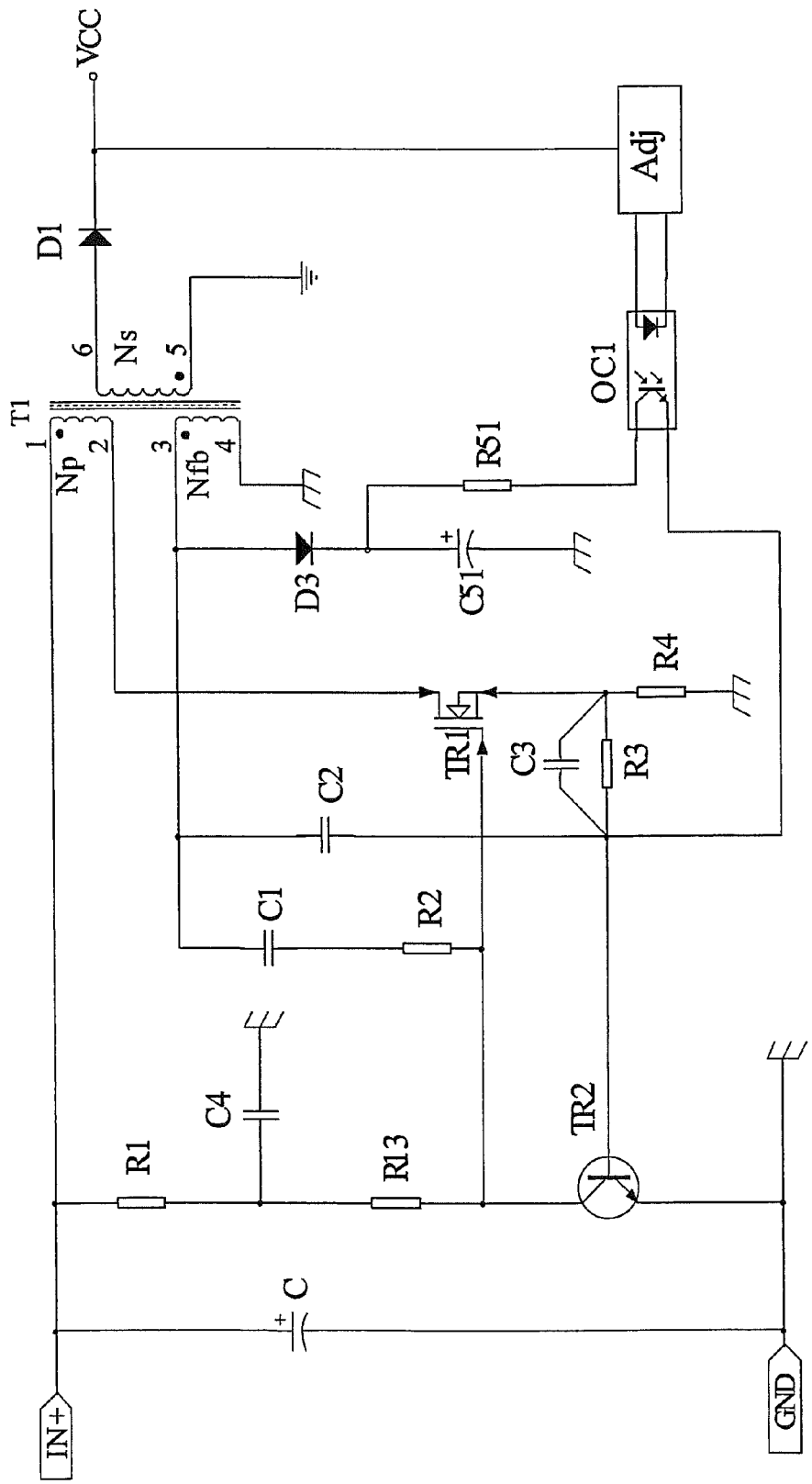
FIG. 5 is a circuit diagram according to the second embodiment of the invention.

In FIG. 5, the converter in accordance with the first embodiment of the invention includes a transformer T1, a FET TR1, a photoelectric coupling isolator OC1 and a circuit Adj, the input of the circuit is connect to the source of the FET TR1 via the primary winding Np of transformer T1 and to the collector of the transistor TR2 via resistances R1 and R13, the gate of the FET TR1 is connected to the collector of the transistor TR2, and the collector of the transistor TR2 is also connected to the secondary winding Nfb via a resistance R2 and a capacitance C1. The source of the transistor TR1 is connected to ground via a resistance R4 and to the base of the transistor TR2 via parallel connection of a resistance R3 and a capacitance C3. The base of the transistor TR2 is connected to the emitter of the photoelectric coupling isolator OC1, and to the common polarity terminal of the feedback winding Nfb via a capacitance C2. The photoelectric isolator OC1 is connected to the load through the feedback circuit Adj, and the load is connected to the output winding Ns via a diode D1. The opposite polarity terminal of the feedback winding (Nfb) is connected to ground, the common polarity terminal of the feedback winding (Nfb) is also connected to the anode of a diode (D3), the cathode of the diode (D3) is connected to the collector of the photoelectric coupling isolator (OC1) via a resistance (R51), and the cathode of the diode (D3) is connected to ground via the capacitance (C51). Thus, a set of windings are reduced by directly forming a loop circuit between the feedback winding (Nfb) and the photoelectric coupling isolator (OC1). Principle of the embodiment in FIG. 5 is substantially similar to the embodiment described with reference to FIG. 2.

What is claimed is:

1. An isolating self-oscillation flyback converter, including a coupling transformer T1, a FET TR1, a transistor TR2, a photoelectric coupling isolator OC1 and a load feedback circuit Adj, wherein, the common polarity terminal of a feedback winding Nfb of the coupling transformer is connected to the gate of the FET TR1 via a capacitance C1 and a resistance R2, and connected to the base of the transistor TR2 via a capacitance C2, the base of the transistor TR2 is also connected to the emitter of the photoelectric coupling isolator OC1, and, the photoelectric coupling isolator OC1 is connected to the load via the feedback circuit, characterized in that, a loop circuit is directly arranged between the feedback winding Nfb and the photoelectric coupling isolator OC1, for supplying required power to the photo coupler.

2. The isolating self-oscillation flyback converter claimed in claim 1, characterized in that, said loop circuit between the feedback winding and the photoelectric coupling isolator is as follow: the opposite polarity terminal of the feedback winding Nfb is connected to the collector of the photoelectric coupling isolator OC1 via a resistance R51, and connected to ground via a capacitance C51; the common polarity terminal of the feedback winding (Nfb) is also connected to the cathode of a diode D2, and the anode of the diode D is connected to ground; and the feedback winding Nfb provides a voltage for driving the gate of the FET TR1 during the transformer stores power, and charges the capacitance C51 during the transformer releases power, for supplying required power for the photo coupler.

3. The isolating self-oscillation flyback converter claimed in claim 1, characterized in that, said loop circuit between the feedback winding and the photoelectric coupling isolator is as follow: the opposite polarity terminal of the feedback winding Nfb is connected to ground, the common polarity terminal of the feedback winding Nfb is also connected to the anode of a diode D3, the cathode of the diode D3 is connected to the collector of the photoelectric coupling isolator OC1 via a resistance R51, and the cathode of the diode D3 is connected to ground via the electrolytic capacitance C51.

* * * * *